Sept. 30, 1958     H. N. BULL     2,853,780
KITCHEN UTENSIL OR THE LIKE
Filed Oct. 11, 1955
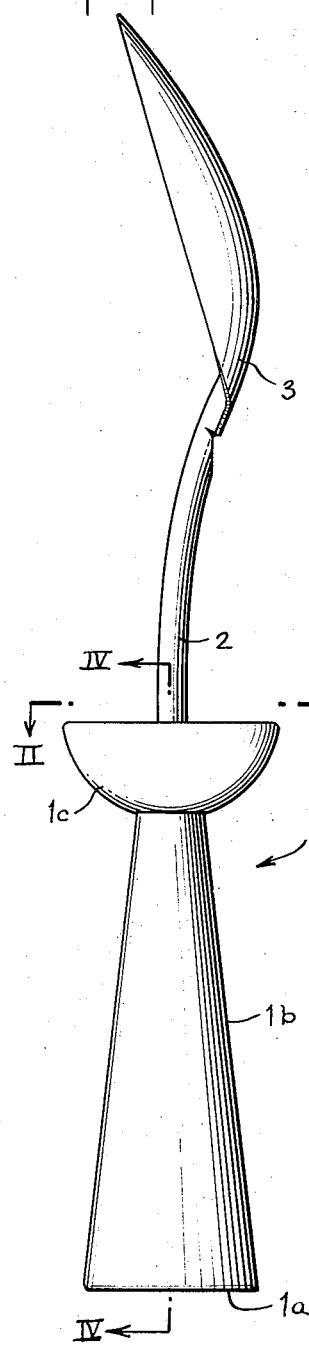
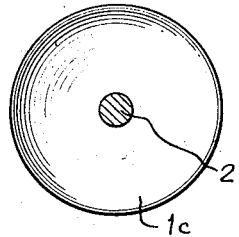
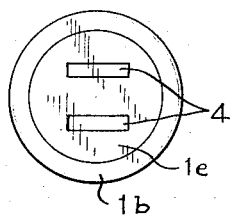
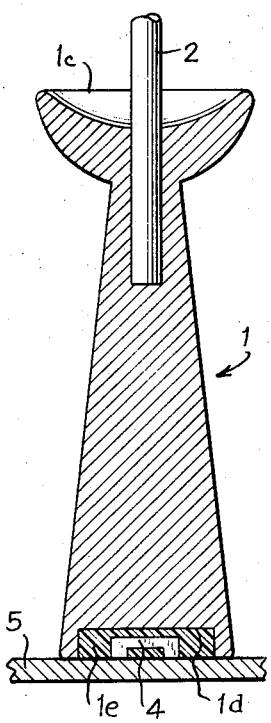
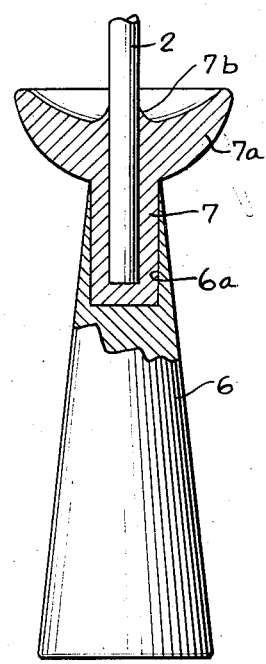
INVENTOR.
HENRY N. BULL
BY
ATTORNEY

United States Patent Office 2,853,780
Patented Sept. 30, 1958

2,853,780

KITCHEN UTENSIL OR THE LIKE

Henry N. Bull, Forest Hills, N. Y.

Application October 11, 1955, Serial No. 539,839

1 Claim. (Cl. 30—327)

This invention relates to kitchen utensils and particularly to an improved handle and supporting structure for kitchen utensils.

It is desirable in many cases to dispose a kitchen utensil vertically. In the case of a mixing spoon, it is common to store the spoon vertically when not in use, for the purpose of saving space or for convenience of access. For example, means may be provided for hanging the spoon by the handle.

Advantages can also be gained by disposing the spoon in a vertical upright position during use, i. e. with the spoon or other utensil disposed with the handle end down on the top of a stove or other horizontal surface and the utensil end up out of contact with the stove or other surface. This vertical disposition of the utensil in such a case will prevent foodstuffs on the spoon from messing the stove and will also save a substantial amount of space on the top of the stove, and is therefore highly desirable because it keeps the stove top clean and saves space on a busy stove.

However, two difficulties with disposing the utensil in the vertical upright position have been that the utensil has little stability, and if the foodstuffs on the spoon are liquid or semi-liquid they will tend to run down the shank and handle of the utensil and on to the stove.

Therefore, the objects of the present invention are to provide a kitchen utensil having a handle with improved means for positively maintaining the utensil in a vertical upright position and providing such utensil with improved structure for preventing liquids or semi-liquids from running down on to the handle and stove.

The foregoing and other objects of the invention are attained in the structures described herein by providing a handle with a flat end surface extending at right angles to the axis of the handle and adapted to abut against a plane surface. A permanent magnet is recessed within the handle and has at least one pole piece adjacent that flat end. The magnet is effective to attract any ferromagnetic surface against which the flat end may be placed and to positively support the utensil in the vertical upright position. A shank projects from the other end of the handle and has a portion thereof nearest the handle aligned with the handle axis, and carries a tool head or instrument on its other end.

A drip cup, encircling the shank, is positioned between the handle and the utensil. The drip cup includes a concave surface which faces upwardly when the utensil is projecting upwardly from the end of the handle. This drip cup is effective to catch any drippings from the spoon or other instrument portion of the utensil. It may also be desirable to arrange the shank and the tool head so that the center of gravity of the entire assembly is aligned with the flat end surface of the handle when the utensil is standing vertically.

Other objects and advantages of the invention will become apparent from a consideration of the following description taken together with the appended claim and the accompanying drawing.

In the drawing:

Fig. 1 is an elevational view of a kitchen utensil embodying my invention;

Fig. 2 is a horizontal cross-sectional view taken on the line II—II of Fig. 1, looking in the direction of the arrows;

Fig. 3 is a bottom plan view of the utensil of Fig. 1;

Fig. 4 is a vertical sectional view taken on the line IV—IV of Fig. 1, looking in the direction of the arrows; and Fig. 5 is a view similar to Fig. 4, illustrating a modification.

Referring to the drawing, there is shown a kitchen utensil including a handle generally indicated at 1, a shank 2 and a spoon 3. It should be recognized that any other suitable instrument or tool head could be substituted for the spoon 3. The handle has a flat end surface 1a at its lower end and comprises a generally conical grip portion 1b. At the upper end of the grip portion as shown at Fig. 1, there is formed integrally with the handle a drip cup 1c. The shank 2 is received in a recess provided at the center of the drip cup 1c, being fastened to the handle 1 by bonding or any other suitable conventional means.

The handle 1 may be formed of plastic, wood or any other suitable material. Within the lower end of the handle, there is provided a recess 1d which receives a plastic insert 1e, in which is molded a magnet 4. The magnet 4 may be inserted and held in place in the recess by any other suitable means. The magnet 4 is shown as having two pole pieces which are flat and coextensive with the flat end of the handle. While this construction has many advantages, and is preferred, it is necessary only that one of the pole pieces be adjacent the end of the handle. The pole piece or pieces, may be slightly spaced from the end by a covering of plastic material or a suitable coating or it may be desirable to have the magnet poles at the surface of the end of the handle to directly contact the metal surface.

When the utensil is mounted on a ferromagnetic surface such as the surface shown at 5 in Fig. 4, the magnet 4 attracts that surface and holds the utensil in a vertical position. A portion of the shank 2 may be angularly offset from the axis of the handle and the spoon 3 or other tool head may be balanced against that offset portion so that the center of the gravity of the utensil may be aligned with the end surface 1a, so that the weight of the handle produces no substantial torque tending to turn the utensil over on its side. Thus, preferably, the center of gravity is aligned with the axis of the handle. The utensil therefore tends to remain stable in this position. However, it is positively maintained in the upright position by the magnetic force so that the utensil will remain upright even though it receives a substantial lateral bump. When the spoon is upright, the drip cup 1c is effective to receive any drippings which may fall from the spoon 3.

Fig. 5 illustrates a modification, particularly with respect to the drip cup structure and with respect to the manner of fastening the shank in the handle. In Fig. 5, a handle 6 consists of a conical grip portion only and is provided at its upper end with a recess 6a to receive a molded plastic insert 7. The plastic insert 7 has a central portion apertured to receive the shank 2. A peripheral portion 7a of the insert 7 is molded or otherwise shaped in the form of a drip cup. The bottom of the drip cup, near the shank 2 is provided with a projection 7b which encircles the shank 2 so that the drippings from the spoon or other utensil accumulating in the bottom of the drip cup do not accumulate at the joint between the insert 7 and the shank 2 and so that cleaning of the utensil is facilitated. If desired, the projection 7b may be extended upwardly to or beyond the rim of the drip cup. The handle, the insert for the magnet, and the drip cup portions of the utensil, may be made in one piece or several pieces as desired in order to achieve the desired styling of the product by making them all of one color or of several colors and to effect ease and economy of manufacture.

It should be understood that the structures shown are equally readily supported on the underside of a horizontally extending magnetic structure, the magnet 4 being then effective to hold the utensil projecting downwardly from that support, as well as achieving the advantages and objects obtainable from disposing it in the vertical upright position.

While I have shown and described certain preferred embodiments of my invention, other modifications thereof will readily occur to those skilled in the art, and I therefore intend my invention to be limited only by the appended claim.

I claim:

A kitchen utensil comprising a handle having the general shape of a cone with a flat end surface of substantial area defining the base of the cone and extending at right angles to the handle axis, a shank projecting from the other end of the handle and having at least the portion thereof nearest the handle aligned with the handle axis, a tool head attached to the shank, cup-shaped wall means projecting outwardly from said handle and concentric therewith at a locality remote from said flat end, said wall means defining a drip cup open at the side farthest from said flat end, said wall means tapering outwardly from a relatively thick portion adjacent the handle to a relatively thin periperal portion, said handle, shank, head and cup-shaped wall means having their combined center of gravity vertically above said end surface when said end surface is abutting a flat horizontal support, so that the utensil is stable in that position against the force of gravity, and a permanent magnet within said handle and having at least one pole piece adjacent said end surface, said magnet being effective to attract any adjacent ferromagnetic body and effective when said flat horizontal support is of ferromagnetic material to increase the stability of the utensil against the force of gravity, said drip cup being effective when said utensil is standing upright on said flat support to catch drippings from said tool head, and said drip cup having an inside surface which is concave upward when said utensil is standing upright on said flat support, said inside surface having its lowest point substantially below the joint between the shank and the cup, so that drippings from the tool head accumulate below said joint.

References Cited in the file of this patent

UNITED STATES PATENTS

| 1,496,888 | Kalinowski | June 10, 1924 |
| 1,501,020 | Small | July 8, 1924 |
| 2,385,859 | Jacobson | Oct. 2, 1945 |

FOREIGN PATENTS

| 738,077 | France | Oct. 11, 1932 |
| 1,091,882 | France | Nov. 3, 1954 |